A. Ladd,
Check Rein Hook.
No. 113,065      Patented Mar. 28. 1871.
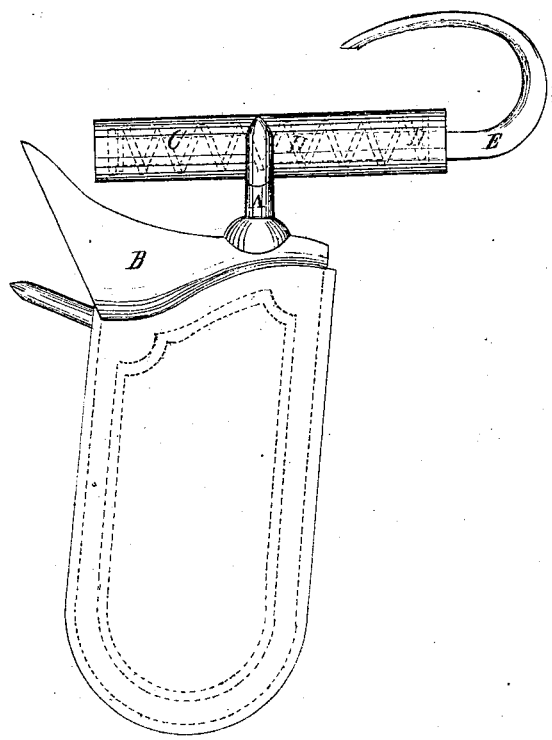
Witnesses
Wm H Seaman
Edw. F. Brown
Inventor
ALEXANDER LADD
Daniel Breed Att

United States Patent Office.

ALEXANDER LADD, OF ST. LAWRENCE, NEW YORK.

Letters Patent No. 113,065, dated March 28, 1871.

IMPROVEMENT IN CHECK-REIN HOOKS.

The Schedule referred to in these Letters Patent and making part of the same.

*To all whom it may concern:*

Be it known that I, ALEXANDER LADD, of St. Lawrence, in the county of Jefferson and State of New York, have invented a new and useful Improvement in Hooks for Check-Reins, of which the following is a full description.

My invention consists of the arrangement of a coiled spring upon the shank of a check-hook, for the purpose of giving an elastic attachment to a harness-saddle.

In the accompanying drawing is represented a side view of my invention, attached to a saddle for harness.

Upon the hook-terret A of the saddle B is a hollow cylinder, C, in which is placed a coiled spring, D, on the shank of the hook E, the spring and shank both being represented in dotted lines.

The check-rein is put over the hook in the usual way, and by the above arrangement the hook has an elastic attachment to the saddle, thus relieving the horse's neck from the usual rigid tension of the check-rein; also, when the horse stumbles or catches his toe the sudden jerk on his neck is prevented; likewise the tail is relieved from too severe pressure of the crupper, especially in bitting colts and training young horses.

Having thus fully described my invention,

I claim—

A check-hook of a harness-saddle, when provided with a coiled spring and attached to the top of said saddle, so that the hook will slide back and forth in relation to the saddle, substantially in the manner set forth.

ALEXANDER LADD.

Witnesses:
 DANIEL BREED,
 WM. H. SEAMAN.